US012749202B2

(12) United States Patent
Christian et al.

(10) Patent No.: US 12,749,202 B2
(45) Date of Patent: Sep. 29, 2026

(54) StarNAV OPTICAL SENSOR SYSTEM

(71) Applicant: RENSSELAER POLYTECHNIC INSTITUTE, Troy, NY (US)

(72) Inventors: John Allen Christian, Marietta, GA (US); Paul Dickson McKee, Averill Park, NY (US); Michael Kudenov, Raleigh, NC (US); Hoang Nguyen, Raleigh, NC (US)

(73) Assignee: Rensselaer Polytechnic Institute, Troy, NY (US)

( * ) Notice: Subject to any disclaimer, the term of this patent is extended or adjusted under 35 U.S.C. 154(b) by 204 days.

(21) Appl. No.: 18/573,667

(22) PCT Filed: Jun. 22, 2022

(86) PCT No.: PCT/US2022/034467

§ 371 (c)(1),
(2) Date: Dec. 22, 2023

(87) PCT Pub. No.: WO2022/271789

PCT Pub. Date: Dec. 29, 2022

(65) Prior Publication Data

US 2024/0289968 A1 Aug. 29, 2024

Related U.S. Application Data

(60) Provisional application No. 63/349,744, filed on Jun. 7, 2022, provisional application No. 63/213,375, filed on Jun. 22, 2021.

(51) Int. Cl.
*G06T 7/246* (2017.01)
*B64G 1/36* (2006.01)
(Continued)

(52) U.S. Cl.
CPC ............ *G06T 7/246* (2017.01); *G01C 21/025* (2013.01); *G01C 21/24* (2013.01); *B64G 1/361* (2013.01);
(Continued)

(58) Field of Classification Search
CPC ...... G01C 21/025; G01C 21/02; G01C 21/24; G01C 17/34; G01C 21/10; G01C 21/1656;
(Continued)

(56) References Cited

U.S. PATENT DOCUMENTS 5,465,212 A * 11/1995 Fowler .................... F41G 9/002 701/4
5,935,195 A * 8/1999 Quine .................... B64G 1/361 701/513
(Continued)

FOREIGN PATENT DOCUMENTS

CN 101178312 A 5/2008
CN 101692001 B 5/2011
(Continued)

OTHER PUBLICATIONS

Perryman, M.A.C.. "The Hipparcos Catalog Contents." Wayback Machine captured Mar. 11, 2016. URL: https://web.archive.org/web/20160311061210/https://www.cosmos.esa.int/documents/532822/546798/oral01_01.pdf/7a5ed6b0-d035-4235-9839-fc2a2bed2544. Accessed Sep. 24, 2025. (Year: 2016).*
(Continued)

*Primary Examiner* — Hunter B Lonsberry
*Assistant Examiner* — Henry R Hinton
(74) *Attorney, Agent, or Firm* — Barclay Damon LLP; Anthony P. Gangemi

(57) ABSTRACT

In an embodiment, there is provided a method for determining a spacecraft instantaneous velocity using starlight. The
(Continued)

200 method includes determining, by a star pairing module, a plurality of star pairs in a selected star field image. The selected star field image includes a plurality of star images. The method includes estimating, by a line of sight estimation module, an apparent bearing direction to each star in at least some of the plurality of star pairs; determining, by the line of sight estimation module, a respective apparent inter-star angle for each star pair of the least some star pairs; and estimating, by a velocity estimation module, a spacecraft velocity to within a total velocity error based, at least in part, on the apparent inter-star angles.

20 Claims, 5 Drawing Sheets

(51) Int. Cl.
*G01C 21/02* (2006.01)
*G01C 21/24* (2006.01)

(52) U.S. Cl.
CPC ............... *G06T 2207/10032* (2013.01); *G06T 2207/30252* (2013.01)

(58) Field of Classification Search
CPC ........... G01C 25/005; G06T 7/73; G06T 7/60; B64G 1/361; B64G 1/244; B64G 1/36; B64G 1/245; B64G 1/369; G01S 3/7867; G01S 19/40; G01S 19/47; G05D 1/101
See application file for complete search history.

(56) References Cited

U.S. PATENT DOCUMENTS

| | | | |
|---|---|---|---|
| 6,227,496 | B1 | 5/2001 | Yoshikawa et al. |
| 6,691,033 | B1 | 2/2004 | Li et al. |
| 6,858,844 | B2 | 2/2005 | Zach |
| 7,197,381 | B2 | 3/2007 | Sheikh et al. |
| 7,216,036 | B2 | 5/2007 | Brady |
| 7,349,803 | B2 | 3/2008 | Belenkii et al. |
| 7,447,591 | B2 | 11/2008 | Belenkii et al. |
| 8,019,544 | B2 | 9/2011 | Needelman |
| 8,301,377 | B2 | 10/2012 | Kamel et al. |
| 8,676,490 | B1 | 3/2014 | Rosenwinkel et al. |
| 9,217,643 | B1 | 12/2015 | Belenkii et al. |
| 9,453,731 | B2 * | 9/2016 | Vos ........................ G01C 21/24 |
| 9,544,488 | B2 | 1/2017 | Dawson |
| 9,791,278 | B2 | 10/2017 | McCroskey et al. |
| 2005/0154529 | A1 | 7/2005 | Needelman et al. |
| 2010/0103251 | A1 * | 4/2010 | Numako ............ H04N 1/00827 348/222.1 |
| 2011/0007167 | A1 | 1/2011 | Katake et al. |
| 2014/0236401 | A1 * | 8/2014 | Tsao ......................... B64G 3/00 701/13 |
| 2014/0340522 | A1 * | 11/2014 | Dawson ................. H04N 23/58 348/169 |
| 2015/0219744 | A1 | 8/2015 | Eikenberry et al. |
| 2018/0267282 | A1 | 9/2018 | Kaufman |
| 2019/0033421 | A1 * | 1/2019 | Laine ................. G02B 13/0015 |
| 2019/0041217 | A1 * | 2/2019 | Ben-Moshe .............. G06T 7/73 |
| 2020/0256678 | A1 | 8/2020 | Li et al. |
| 2020/0329199 | A1 | 10/2020 | Nomura |
| 2021/0033400 | A1 | 2/2021 | Belenkii et al. |

FOREIGN PATENT DOCUMENTS

| | | | |
|---|---|---|---|
| CN | 102252673 | B | 10/2012 |
| CN | 103884333 | A | 6/2014 |
| EP | 2105380 | A1 | 9/2009 |
| KR | 20140141718 | A | 12/2014 |
| WO | 2016116856 | A1 | 7/2016 |

OTHER PUBLICATIONS

Zhang, Jun et al.. "An enhanced Cramer-Rao bound weighted method for attitude accuracy improvement of a star tracker." Review of Scientific Instruments, vol. 87, issue 6. URL: https://pubs.aip.org/aip/rsi/article/87/6/063112/900769/An-enhanced-Cramer-Rao-bound-weighted-method-for. Accessed Sep. 24, 2025. (Year: 2016).*

International Search Report and The Written Opinion of the International Searching Authority, International Application No. PCT/US2022/034467, mailed Dec. 2, 2022.

Christian, J.A., "StarNAV: Autonomous Optical Navigation of a Spacecraft by the Relativistic Perturbation of Starlight," Sensors, vol. 19, pp. 1-61, 2019.

Chen, X., et al., "A Novel Autonomous Celestial Integrated Navigation for Deep Space Exploration Based on Angle and Stellar Spectra Shift Velocity Measurement," Sensors, vol. 19, pp. 1-15, 2019.

Spratling, IV, B.B., et al., "A Survey on Star Identification Algorithms," Algorithms, vol. 2, pp. 93-107, 2009.

* cited by examiner

StarNAV OPTICAL SENSOR SYSTEM

CROSS REFERENCE TO RELATED APPLICATION(S)

This application claims the benefit of U.S. Provisional Application No. 63/213,375, filed Jun. 22, 2021, and U.S. Provisional Application No. 63/349,744, filed Jun. 7, 2022, which are incorporated by reference as if disclosed herein in their entireties.

GOVERNMENT LICENSE RIGHTS

This invention was made with government support under grant award number 80NSSC20K1018, awarded by the National Aeronautics and Space Administration. The government has certain rights in the invention.

FIELD

The present disclosure relates to an optical sensor system, and, more specifically, to a starlight navigation ("StarNAV") optical sensor system.

BACKGROUND

Starlight navigation ("StarNAV") is configured to use measurements of relativistic perturbation of starlight to autonomously estimate a velocity of a spacecraft. Specifically, a change in inter-star angle due to stellar aberration may be used to estimate vehicle velocity. The velocity estimate may then be used for navigation.

Measuring stellar aberration has its own challenges. For a spacecraft traveling at typical orbital speeds, estimating velocity with error on the order of 1.0 m/s (meter/second) typically requires star bearing measurements with an accuracy on the order of milliarcseconds (mas). Thus, an instrument built to measure stellar aberration of a single star has precise pointing requirements beyond the capabilities of most modern spacecraft Attitude Determination and Control Systems (ADCS). A strategy for avoiding mas-level pointing requirements for this application is to instead consider a change in angle between stars. This inter-star angle is invariant to (i.e., does not depend on) the attitude of the observer (i.e., the spacecraft), and thus an instrument that can precisely determine inter-star angles is sufficient.

One approach for determining the change in inter-star angle due to stellar aberration is by a precise measurement of individual star directions with a telescope or interferometer. With measurements to three stars, three inter-star angles may then be calculated, and these can be used to estimate the instantaneous velocity of the spacecraft. High-precision sensing of a few stars generally relies on having an optical sensor with a relatively narrow field-of-view (FOV) in order to achieve an appropriate angular resolution. Some degree of fine pointing may then be needed to maintain each target star within the relatively narrow FOV. The inter-star angle is relatively large, thus each star is typically sensed with a respective optical system. A plurality of telescopes or interferometers may be used, with a relatively accurate metrology system configured to monitor a relative alignment between the plurality of telescopes or interferometers. Such systems may be relatively complicated and relatively expensive.

SUMMARY

In an embodiment, there is provided a method for determining a spacecraft instantaneous velocity using starlight. The method includes determining, by a star pairing module, a plurality of star pairs in a selected star field image. The selected star field image includes a plurality of star images. The method includes estimating, by a line of sight estimation module, an apparent bearing direction to each star in at least some of the plurality of star pairs; determining, by the line of sight estimation module, a respective apparent inter-star angle for each star pair of the least some star pairs; and estimating, by a velocity estimation module, a spacecraft velocity to within a total velocity error based, at least in part, on the apparent inter-star angles.

In some embodiments, the method further includes capturing, by an optical sensor, the selected star field image The optical sensor includes at least one wide field of view (FOV) camera.

In some embodiments of the method, the determining the plurality of star pairs in the selected star field image includes forming star pairs with relatively large inter-star angles.

In some embodiments of the method, the estimating the apparent bearing direction includes centroiding.

In some embodiments of the method, each apparent inter-star angle is in the range of 600 to 120°.

In some embodiments of the method, the total velocity error is less than or equal to a target total velocity error maximum.

In some embodiments, the method further includes filtering, by a StarNAV module, the star field image based, at least in part, on at least one of vibration and/or angular motion information received from the spacecraft. The filtering is configured to reduce or eliminate an effect of the vibration and/or angular motion.

In some embodiments of the method, a bearing error is less than or equal to 1/10 of an instantaneous field of view of the wide FOV camera and is related to a camera signal to noise ratio (SNR).

In some embodiments of the method, determining the plurality of star pairs is configured to achieve at least some associated inter-star angles in a range of 600 to 120°.

In some embodiments of the method, a star brightness cutoff magnitude is less than or equal to 14.

In an embodiment, there is provided an optical sensor system for determining a spacecraft instantaneous velocity using starlight. The system includes a StarNAV (starlight navigation) module. The StarNAV module includes a star pairing module, a line of sight estimation module, and a velocity estimation module. The star pairing module is configured to determine a plurality of star pairs in a selected star field image. The selected star field image includes a plurality of star images. The selected image is received from an optical sensor. The line of sight estimation module is configured to estimate an apparent bearing direction to each star in at least some of the plurality of star pairs. The line of sight estimation module is further configured to determine a respective apparent inter-star angle for each star pair of the least some star pairs. The velocity estimation module is configured to estimate a spacecraft velocity to within a total velocity error based, at least in part, on the apparent inter-star angles.

In some embodiments, the system includes an optical sensor configured to capture at least one star field image. The optical sensor includes at least one wide field of view (FOV) camera. Each wide FOV camera is configured to capture a respective star field image including a respective plurality of star images.

In some embodiments of the system, the optical sensor includes three wide FOV cameras, arranged orthogonally to each other.

In some embodiments of the system, each wide FOV camera has a field of view of at least 40 degrees.

In some embodiments of the system, the total velocity error is less than or equal to a target total velocity error maximum.

In some embodiments, the system further includes a StarNAV module configured to filter the star field image based, at least in part, on at least one of vibration and/or angular motion information received from the spacecraft. The filtering is configured to reduce or eliminate an effect of the vibration and/or angular motion.

In some embodiments of the system, the estimating the apparent bearing direction includes centroiding.

In some embodiments of the system, the determining the plurality of star pairs in the selected star field image includes forming star pairs with relatively large inter-star angles.

In some embodiments of the system, a bearing error is less than or equal to 1/10 of an instantaneous field of view of each wide FOV camera.

In some embodiments, there is provided a computer readable storage device having stored thereon instructions that when executed by one or more processors result in the following operations including any one of the embodiments of the method.

BRIEF DESCRIPTION OF DRAWINGS

The drawings show embodiments of the disclosed subject matter for the purpose of illustrating features and advantages of the disclosed subject matter. However, it should be understood that the present application is not limited to the precise arrangements and instrumentalities shown in the drawings, wherein.

Figure 1:
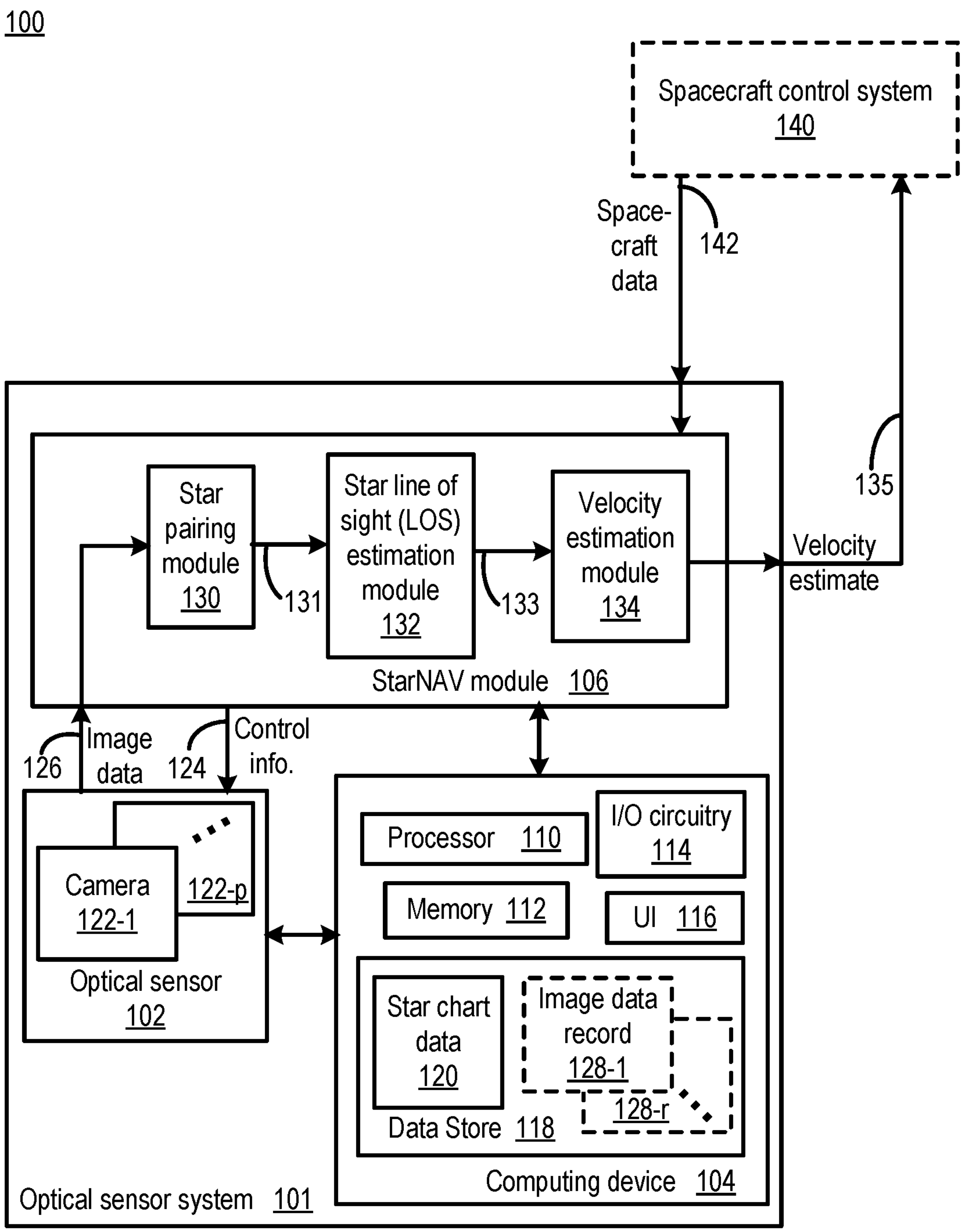
FIG. 1 illustrates a functional block diagram of a system that includes StarNAV optical sensor system for estimating a spacecraft instantaneous velocity using starlight, according to several embodiments of the present disclosure.

Although the following Detailed Description will proceed with reference being made to illustrative embodiments, many alternatives, modifications, and variations thereof will be apparent to those skilled in the art.

DETAILED DESCRIPTION

Generally, a method, apparatus, and/or system, according to the present disclosure, is configured to estimate an instantaneous velocity of a spacecraft from measurements of starlight that have been perturbed by stellar aberration. The starlight may be sensed by an optical sensor that includes at least one relatively wide field of view (FOV) camera. In one nonlimiting example, the optical sensor may include three wide FOV cameras. As used herein, wide FOV corresponds to a FOV of on the order of ten degrees. In one nonlimiting example, wide FOV may correspond to a FOV of at least 40 degrees. Each wide FOV camera is configured to capture starlight from a plurality of stars in a respective FOV, and to provide a corresponding star field image. Thus, a selected star field image may include images of a plurality of stars.

A respective apparent bearing direction to each of at least some stars of the plurality of stars may be estimated based, at least in part, on each corresponding star field image. At least some stars of the plurality stars may be grouped into a plurality of respective star pairs. A respective inter-star angle may be estimated for each of at least some pairs. An instantaneous spacecraft velocity may then be estimated based, at least in part, on the apparent inter-star angles corresponding to apparent bearing directions and based, at least in part, on actual inter-star angles corresponding to actual bearing directions determined from a corresponding star catalog. The instantaneous spacecraft velocity estimate is thus related to measured (i.e., apparent) and actual inter-star angles between images of selected pairs of stars included in a selected star field image.

For example, StarNAV autonomous navigation is configured to measure apparent line-of-sight (LOS) directions (i.e., bearing direction) to stars whose apparent LOS directions have been perturbed by stellar aberration. The apparent LOS directions of a selected star pair may then be related by a cosine of the angle between them. It may be appreciated that using a wide FOV optical camera for StarNAV corresponds to a relatively higher uncertainty in each apparent bearing direction measurement. In other words, while increasing the FOV of a camera may allow capturing starlight from relatively more stars, an angle swept by each pixel in a corresponding image also increases. A trade is thus introduced between FOV, bearing direction uncertainty and ultimately total velocity error. Parameters affecting the total velocity error may include, but are not limited to, camera parameters (e.g., FOV, focal length, instantaneous field-of-view (ifov), resolution, and/or minimum star brightness the camera can detect), number of cameras, number of star pairs that can be made from observed stars, bearing direction error to each star, and/or the total velocity error.

A StarNAV velocity estimation technique has been described in: J. Christian, *Starnav: Autonomous optical navigation of a spacecraft by the relativistic perturbation of starlight*, Sensors 19 (2019) 4064, that is incorporated by reference as if disclosed herein in its entirety. A simplified version of the StarNAV velocity estimation technique is described herein. The simplified technique does not take into account gravitational perturbation of light, that results in a dependence of star LOS measurements on spacecraft position. It may be appreciated that ignoring the gravitational perturbation of light is functionally identical to assuming that the spacecraft performing StarNAV is sufficiently distant from any massive bodies that starlight is not appreciably warped by gravity.

Following the StarNAV velocity estimation technique, a star catalog LOS direction to an $i^{th}$ star may be termed $u_i$, an observed LOS direction after gravitational deflection is $u_i'$ (assumed identical to $u_i$, herein), and an observed LOS direction (i.e., apparent LOS direction) to the $i^{th}$ star after stellar aberration is $u_i''$. An apparent angle between the $i^{th}$ star and a $j^{th}$ star may then correspond to:

$$u_i''^T u_j'' = \cos(\theta_{ij}'') \tag{1}$$

Equation ("Eq.") (1) can be written, in terms of spacecraft velocity and non-perturbed (i.e., actual) star LOS directions as:

$$\cos(\theta''_{ij}) = u''^T_i u''_j = 1 - (1 - u'^T_i u'_j)\left[\frac{1 - \beta^T\beta}{(1 + \beta^T u'_i)\ (1 + \beta^T u'_j)}\right] \tag{2}$$

where β=v/c corresponds to spacecraft velocity, v, divided by the speed of light, c. Expanding about $\beta=0_{3\times1}$ yields:

$$u''^T_i u''_j = u'^T_i u'_j + (1 - u'^T_i u'_j)\{[\beta^T u'_i + \beta^T u'_j] - [(\beta^T u'_i)^2 + (\beta^T u'_j)^2 + (\beta^T u'_i)(\beta^T u'_j) - \beta^T\beta]\} + O(\|\beta\|^3) \tag{3}$$

After substituting $u_i=u_i'$ and $u_j=u_j'$, Eq. 3 can be rewritten as:

$$u''^T_i u''_j = u^T_i u_j + \frac{1}{c}(1 - u^T_i u_j)\left[(u^T_i - u^T_j)v - \frac{1}{c}v^T A_{ij} v\right] + O(c^{-3}) \tag{4}$$

where $$A_{ij} = u_i u_i^T + u_j u_j^T + \frac{1}{2}(u_i u_j^T + u_j u_i^T) - I_{3\times3} \tag{5}$$

Grouping measurements on the left of the equal sign and terms linear in velocity on the right hand side, and accommodating a plurality of similar measurements, yields a system of linear equations:

$$\begin{bmatrix} u''^T_i u''_j - u^T_i u_j \\ \vdots \\ u''^T_p u''_l - u^T_p u_l \end{bmatrix} = \begin{bmatrix} H_{V_{ij}} \\ \vdots \\ H_{V_{pl}} \end{bmatrix} v_{(k)} \tag{6}$$

$$Y = H_V v_{(k)} \tag{7}$$

where $H_V$ is a measurement sensitivity matrix, and the $ij^{th}$ row of $H_V$ is:

$$H_{V_{ij}} = \frac{1}{c}(1 - u^T_i u_j)\left(u^T_i + u^T_j - \frac{1}{c}(v^T_{(k-1)} A_{ij})\right) \tag{8}$$

The set of linear equations (Eq. (6)) may then be evaluated a number of times with a nonzero initial guess of spacecraft velocity until an estimate of velocity converges. The solution may then follow a maximum likelihood estimation (MILE) approach as:

$$\hat{v}_{(k)} = (H_V^T R^{-1} H_V)^{-1} H_V^T R^{-1} Y \tag{9}$$

where R corresponds to a measurement covariance matrix, and contains information regarding the uncertainty in each star pair measurement, and correlation between star pair measurements. As is known, maximum likelihood estimation (MLE) is a technique for estimating one or more parameters of an assumed probability distribution based, at least in part, on observed data. In one nonlimiting example, diagonal elements in R may be determined as:

$$R_{ij,ij} = u''^T_i R_{u''_j} u''_i + u''^T_j R_{u''_i} u''_j \tag{10}$$

and off-diagonal elements in R may be determined as:

$$R_{ij,il} = u''^T_j R_{u''_i} u''_l \tag{11}$$

where:

$$R_{u''_i} \approx \sigma^2_{\phi_i}(I_{3\times3} - u''_i u''^T_i)$$

and $\sigma_{\phi i}$ is the standard deviation of the bearing uncertainty of the $i^{th}$ star measurement. An analytic covariance of the velocity estimate may be determined as:

$$P_{VV} = (H_V^T R^{-1} H_V)^{-1} \tag{12}$$

The Total Velocity Error (TVE) may then be determined as:

$$TVE = \sqrt{tr[P_{VV}]} \tag{13}$$

where "tr" corresponds to the trace of a square matrix (i.e., the sum of elements on the main diagonal (from the upper left to the lower right) of the square matrix (n×n).

A StarNAV optical sensor system may be configured to estimate a velocity of a spacecraft using starlight, based, at least in part, on stellar aberration. The StarNAV optical sensor system may include an optical sensor that includes at least one camera. One or more parameters of the optical sensor system may be selected configured to achieve a TVE less than or equal to a target maximum value. The parameters may include, but are not limited to, number of cameras, camera parameters for each camera (e.g., a focal length, field of view (FOV), instantaneous field of view (ifov, i.e., the angle swept out by a single pixel), resolution (i.e., number of pixels in a focal plane array)), minimum detectable star brightness, centroiding capability, target signal to noise ratio (SNR), and/or bearing error (i.e., uncertainty in a line of sight measurement to a star).

It may be appreciated that increasing the FOV of a camera also increases an angle swept by a pixel (i.e., ifov). This means that for a given centroiding technique, a bearing direction to a star determined based on an image captured by a relatively wide FOV camera may have a relatively higher uncertainty compared to an image captured by a camera with a relatively narrower FOV. As is known, centroiding is a technique that may be used to reduce bearing error. A camera may not perceive a star as a single point of light due to diffraction of starlight as it passes through a camera aperture resulting in detection of an Airy pattern. A wide FOV camera may perceive the Airy pattern of a given star in a single pixel resulting in a one pixel lower bound on a precision of a bearing direction estimate. Less than pixel level precision may be achieved by defocusing the camera to blur light from a single star over multiple pixels combined with centroiding.

In one nonlimiting example, using a centroiding technique may provide a bearing error on the order of 1/10 of a pixel for a wide FOV camera.

Utilizing a wide FOV camera may result in capturing images of a relatively large number of stars in one star field image. Additionally or alternatively, total velocity error may be related to a relative size of inter-star angle used for velocity estimation. In an embodiment, inter-star angles may be in the range of about 60° to about 120°. For example, TVE may approach a minimum for inter-star angles of approximately 90°.

Thus, a StarNAV optical sensor system, according to the present disclosure, may be configured to capture a star field image using a wide FOV camera. Apparent bearing direction and associated inter-star angles may be determined and compared to corresponding star catalog values. Bearing uncertainty to each star image in the captured star field image may be accommodated by determining apparent inter-star angles of a relatively large number of star images. A relatively high accuracy metrology system may then not be used.

It may be appreciated that TVE provides a constraint on the StarNAV optical sensor system that may affect one or more parameters and, in some circumstances provides a trade between two or more parameters. Such parameters may include, but are not limited to, camera resolution, sensitivity, FOV, signal to noise ratio (SNR) associated with camera circuitry, and/or the number of cameras. Motion blur, pixel saturation by relatively bright stars, and star clustering may all affect measurements and/or TVE. A minimum SNR configured to achieve a bearing error of 0.1 pixel for each star direction may be estimated. The minimum SNR may then be related to star magnitude, FOV, and/or integration time. It may be appreciated that integration time is related to blurring caused by continued motion of the spacecraft during StarNAV optical sensor system operations. In one nonlimiting example, a maximum integration time may be one second.

In an embodiment, there is provided a method for determining a spacecraft instantaneous velocity using starlight. The method includes determining, by a star pairing module, a plurality of star pairs in a selected star field image. The selected star field image includes a plurality of star images. The method includes estimating, by a line of sight estimation module, an apparent bearing direction to each star in at least some of the plurality of star pairs; determining, by the line of sight estimation module, a respective apparent inter-star angle for each star pair of the least some star pairs; and estimating, by a velocity estimation module, a spacecraft velocity to within a total velocity error based, at least in part, on the apparent inter-star angles.

FIG. 1 illustrates a functional block diagram of system 100 that includes a StarNAV optical sensor system 101 for estimating a spacecraft instantaneous velocity using starlight, according to several embodiments of the present disclosure. StarNAV optical sensor system 101 may be coupled to a spacecraft control system 140. StarNAV optical sensor system 101 may be configured to provide a velocity estimate 135 to the spacecraft control system 140. In some embodiments, StarNAV optical sensor system 101 may be configured to receive spacecraft data from the spacecraft control system 142. For example, spacecraft data may include, but is not limited to, vibration and/or angular motion information associated with the motion of the spacecraft. In one example, the StarNAV module 106 may be configured to filter the star field image based, at least in part, on at least one of vibration and/or angular motion information received from the spacecraft. The filtering may be configured to reduce or eliminate an effect of the vibration and/or angular motion on the star field images. In another example, StarNAV optical sensor system 101 may be configured to refine the velocity estimate 135 based, at least in part, on the spacecraft data 142.

StarNAV optical sensor system 101 includes an optical sensor 102, a computing device 104, and a StarNAV module 106. Optical sensor 102 and or StarNAV module 106 may be coupled to or included in computing device 104. StarNAV module 106 may be configured to provide control information 124 to optical sensor 102. Control information 124 may include, for example, image capture commands, request for transfer of image data, camera status, etc. Optical sensor 102 may be configured to provide image data 126 to StarNAV module 106. Image data 126 may include, for example, analog and/or digital data corresponding to a brightness detected by each pixel in a corresponding camera focal array. The image data may further include, for example, a camera identifier and/or an index configured to identify a corresponding image.

Optical sensor 102 includes one or more cameras 122-1, . . . , **122-*p*. Each camera 122-1, . . . , 122-*p* is a wide FOV camera, as described herein. In one example, optical sensor 102 may include one camera, e.g., camera 122-1. In another example, optical sensor 102** may include three cameras, i.e., p=3 in this example. However, this disclosure is not limited in this regard.

Computing device 104 may include, but is not limited to, a computing system (e.g., a server, a workstation computer, a desktop computer, a laptop computer, a tablet computer, an ultraportable computer, an ultramobile computer, a netbook computer and/or a subnotebook computer, etc.). Computing device 104 includes a processor 110, a memory 112, input/output (I/O) circuitry 114, a user interface (UI) 116, and data store 118.

Processor 110 is configured to perform operations of StarNAV module 106, and may be configured to perform processing operations associated with optical sensor 102. Memory 112 may be configured to store data associated with optical sensor 102 and/or StarNAV module 106. I/O circuitry 114 may be configured to provide wired and/or wireless communication functionality for StarNAV optical sensor system 101. For example, I/O circuitry 114 may be configured to receive spacecraft data 142 from and to provide a velocity estimate 135 to spacecraft control system 140. In another example, I/O circuitry 114 may be configured to carry data and/or information between optical sensor 102 and StarNAV module 106. UI 116 may include a user input device (e.g., keyboard, mouse, microphone, touch sensitive display, etc.) and/or a user output device, e.g., a display. It may be appreciated that, for autonomous spacecraft, users may not be present and thus, the user input device 116 may be utilized for an initial programming. Data store 118 may be configured to store one or more of star chart data 120, and/or one or more image data records 128-1, . . . , **128-*r***.

StarNAV module 106 includes a star pairing module 130, a star line of sight (LOS) estimation module 132, and a velocity estimation module 134. The star pairing module 130 is configured to receive star field image data 126 from optical sensor 102. The star field image data 126 may include a plurality of star field images, with each star field image including a plurality of star images, as described herein. The star pairing module 130 may be configured to generate (i.e., determine) a plurality of star pairs for a selected star field image based, at least in part, on the received data 126, as described herein. Star pairing module 130 may be further configured to provide corresponding star pair data 131 to star LOS estimation module 132. Star LOS estimation module 132 is configured to receive star pair data 131 from star pairing module 130 and to estimate a corresponding bearing direction for each star and a corresponding inter-star angle for at least some of the star pairs. Star LOS estimation module 132 may then be configured to provide a plurality of inter-star angles 133 for a selected star field image to velocity estimation module 134. Velocity estimation module 134 may then be configured to estimate spacecraft velocity based, at least in part, on the inter-star angles 133 for the selected star field image. The estimated spacecraft velocity 135 may then be provided to the space craft control system 140.

Thus, the optical sensor 102 may be configured to capture one or more star field images using at least one wide FOV camera. StarNAV module 106 may then be configured to estimate a the instantaneous velocity based, at least in part, on inter-star angles of a plurality of star images included in a selected star field image. Determining inter-star angles for star pairs included in one star field image avoids a need for metrology. A relatively larger FOV may correspond to a relatively larger bearing direction uncertainty for each star pair. The relatively larger uncertainty may be managed by capturing relatively more star pairs, as described herein.

Figure 2A:
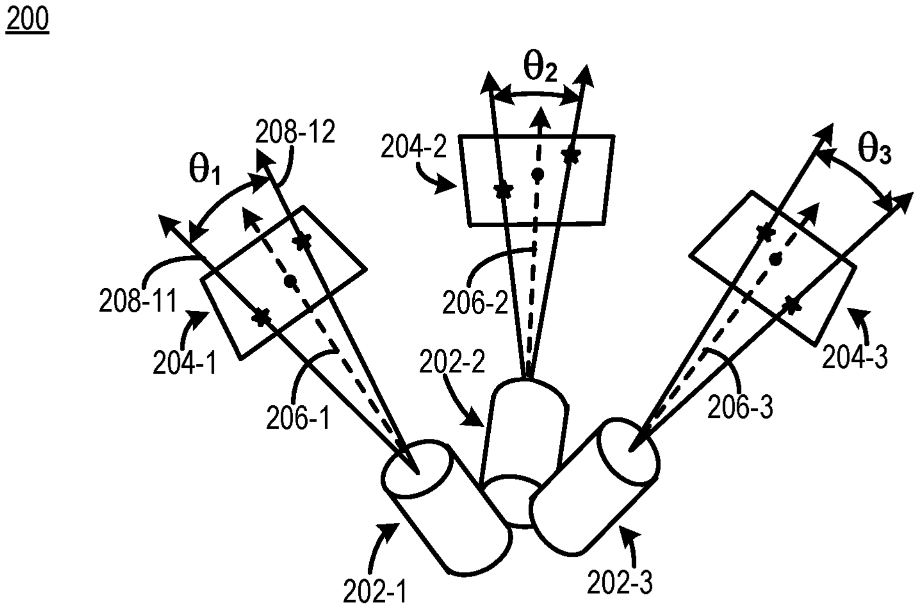
FIG. 2A is a sketch illustrating inter-star angles within star field images from wide field of view (FOV) cameras, according to several embodiments of the present disclosure.

FIG. 2A is a sketch 200 illustrating inter-star angles within star field images from wide field of view (FOV) cameras, according to several embodiments of the present disclosure. Sketch 200 includes three cameras 202-1, 202-2, 202-3, however, this disclosure is not limited in this regard. In other words, more or fewer cameras may be included in an optical sensor, according to the present disclosure. Each camera 202-1, 202-2, 202-3 is configured to capture a respective star field image 204-1, 204-2, 204-3. Each camera 202-1, 202-2, 202-3 may have a wide FOV, as described herein, and may thus be configured to capture starlight from a plurality of star in a single star field image. Relative orientations of the cameras 202-1, 202-2, 202-3 may be configured to provide nonoverlapping FOVs. Each camera 202-1, 202-2, 202-3 may have a corresponding bore sight direction 206-1, 206-2, 206-3. Each bore sight direction 206-1, 206-2, 206-3 may generally intersect the corresponding star field image 204-1, 204-2, 204-3 at or near a center of the star field image. Each star field image 204-1, 204-2, 204-3 may include captured starlight from a plurality of stars, i.e., images of the plurality of stars. A respective selected pair of star images in each star field image 204-1, 204-2, 204-3 may have a corresponding inter-star angle $\theta_1$, $\theta_2$, $\theta_3$ determined based, at least in part, on estimated lines of sight between the corresponding camera and the star images. For example, a first star field image 204-1 has a first line of sight 208-11 to a first star image and a second line of sight 208-12 to a second star image in the first star field image 204-1. The inter-star angle between the estimated lines of sight 208-11, 208-12 may then be $\theta_1$. Thus, one or more wide FOV cameras, according to the present disclosure, may each be configured to capture respective star field images, with each star field image including a plurality of star images.

Figure 2B:
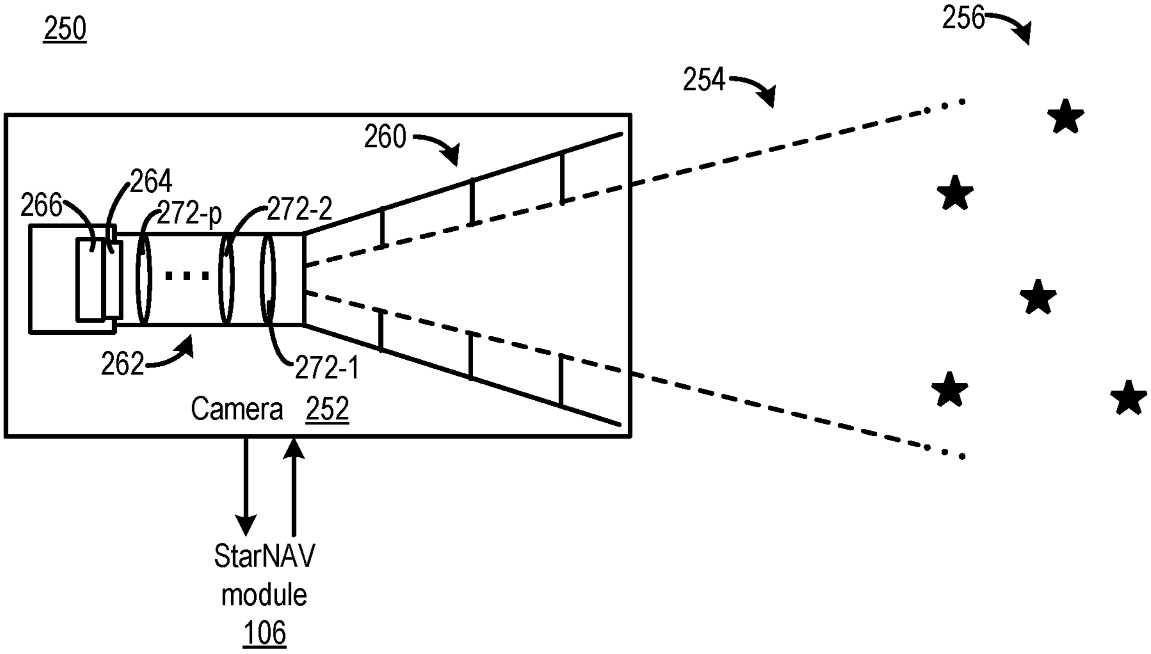
FIG. 2B is a sketch illustrating a camera configured to capture starlight, according to several embodiments of the present disclosure.

FIG. 2B is a sketch 250 illustrating a camera 252 configured to capture starlight, according to several embodiments of the present disclosure. In an embodiment, camera 252 may correspond to a projective space camera, configured to produce a two-dimensional (2D) image of, for example, a portion of a star field, e.g., star field 256. Camera 252 is one example of camera 122-1, . . . , 122-*p* of optical sensor 102 of FIG. 1, and/or cameras 202-1, 202-2, 202-3, of FIG. 2A.

Camera 252 has a FOV 254 that is configured to capture at least a portion of a star field, e.g., star field 256. Camera 252 is configured to receive information from and provide information to a StarNAV module, e.g., StarNAV module 106 of FIG. 1. Camera 252 includes a light baffle 260, an optical assembly 262, a focal plane array 264, and a data processing unit 266. The light baffle 260 is configured to block stray light from entering the camera aperture. The optical assembly, i.e., lens assembly 262, includes a series of refractive lenses 272-1, 272-2, . . . , 272-*p* which focus light collected by the aperture onto a detector at the focal plane. The focal plane array is a 2D array of photodetectors (usually CCD (charge-coupled device) or CMOS (complementary metal oxide semiconductor) sensors) at the focal plane 264 of the camera 252. The brightness of each pixel may be provided to the data processing unit 266 that may then generate a 2D (two-dimensional) digital image of the captured portion of the star field. The camera 252 is configured to capture a plurality of stars in a single image.

A projective 2D camera may be modeled, to first order, by an ideal pinhole camera model, which allows light to pass through an infinitesimal pinhole with no distortion before it lands on the focal plane array. Real (i.e., non-ideal) camera systems are generally relatively more complex than the ideal pinhole camera. Nonideal cameras may suffer from a number of aberrations (i.e., non-idealities). The non-idealities may include, but are not limited to, radial distortion and tangential distortion. These distortions are generally well-understood and may be accounted for through calibration. Thus, a calibrated star camera may be considered an instrument configured to measure line-of-sight directions by mapping them onto pixel coordinates.

It may be appreciated that TVE provides a constraint on the StarNAV optical sensor system that may affect one or more parameters and, in some circumstances provides a trade between two or more parameters, as described herein. Such parameters may include, but are not limited to, camera parameters (e.g., camera resolution, sensitivity, FOV, and signal to noise ratio (SNR) associated with camera circuitry), and/or the number of cameras. Thus, these parameters may be adjusted as part of design of the wide FOV camera(s), e.g., camera 252, according to the present disclosure. In one nonlimiting example, the lens assembly 262, including the series of refractive lenses 272-1, 272-2, . . . , 272-*p*, may be designed to meet one or more design criteria. Optical design parameters may include, but are not limited to, entrance pupil diameter, F/#(ratio of a camera's effective focal length to entrance pupil diameter (EPD)), FOV, wavelength range and/or axial length.

As a proof of concept, and in one nonlimiting example, a camera was designed configured to achieve a TVE of less than or equal to 50 m/s, a centroiding accuracy of 0.1 pixel uncertainty, an integration time of less than one second, and a star brightness cutoff of approximately 12.6. Choosing F/# equal to 2, an entrance pupil diameter was 15 mm, FOV was 44°, wavelength range was 485 to 850 nanometers (nm) and axial length was 249.09 millimeters (mm), and included nine lenses. However, this disclosure is not limited in this regard. It may be appreciated that this camera design was intended as a proof of concept, and is not meant to be limiting. The proof of concept camera design achieved a TVE below the target maximum of 50 m/s. Thus, camera 252 may be configured to capture a star field image, that may then be used to estimate an instantaneous spacecraft velocity, as described herein.

It may be appreciated that determining a plurality of star pairs, with a target constraint on inter-star angle may present a challenge. In an embodiment, a technique for generating a plurality of generally uncorrelated stars may be configured to minimize a number of relatively narrow inter-star angles and to maximize a dispersion of inter-star angle bisectors. However, this disclosure is not limited in this regard, thus, other techniques may be used to determine star pairs, according to the present disclosure.

Figure 3:
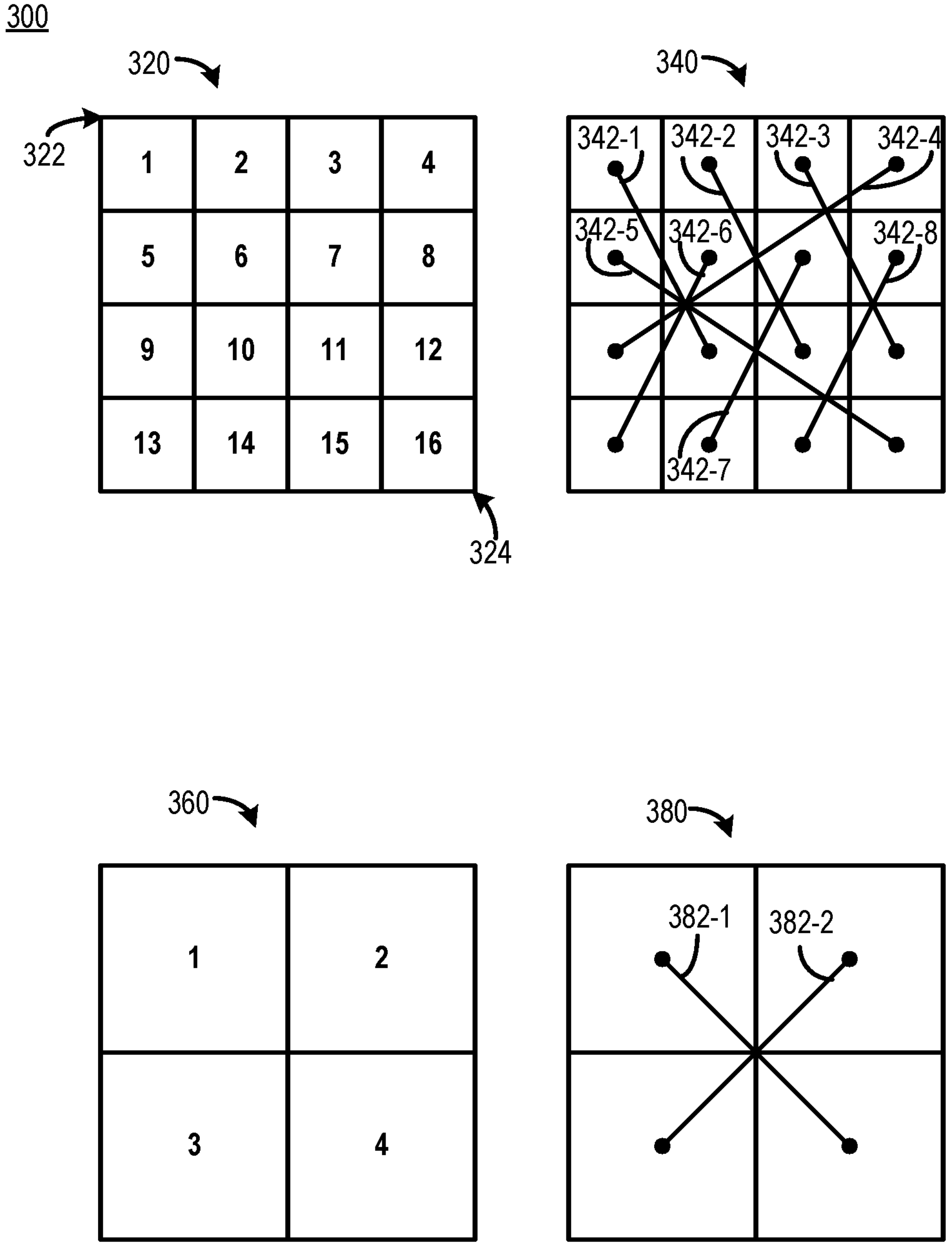
FIG. 3 is a sketch graphically illustrating one example of pairing stars in a star field image.

FIG. 3 is a sketch 300 graphically illustrating one example of pairing stars in a star field image. Example 300 is configured to illustrate dividing an image into sections, pairing stars by pairs of sections, repeating the dividing and pairing using successively larger sections until a stop criterion is reached. This technique is configured to facilitate generating star pairs with corresponding relatively large inter-star angles. As used herein, "relatively large inter-star angle" corresponds to an inter-star angle of at least 60 degrees. It may be appreciated that this technique is one example of pairing stars. However, this disclosure is not limited in this regard, and other techniques may be utilized. It may be further appreciated that although the images illustrated in sketch 300 are generally square, this technique is not limited in this regard, and is applicable to other image shapes, e.g., rectangular star field images.

Sketch 300 includes four images 320, 340, 360, 380. Images 320, 340 illustrate a first round of star pairing by section, and images 360, 380 illustrate a second round of star pairing by section. Initially, a first star pair may be determined by pairing a first star near a first corner, e.g., corner 322 with a second star near a diagonally opposed corner, e.g., corner 324. The first round of star pairing by section, i.e., images 320, 340, may then follow this initial pairing. The image 320 may be divided into n sections of generally equal areas. In this example, n is equal to 16. The sections in image 320 are numbered from 1 to 16, beginning with the upper left section near corner 322 and ending with the lower right section near corner 324. Image 340 is configured to illustrate section pairs and, during pairing, a star from a first section in a selected section pair may be paired with a star from a second section. Section pairings are indicated in sketch 300 by lines with dots at the ends. Thus, section pairing 342-1 corresponds to pairing stars from section 1 with stars from section 10, section pairing 342-2 corresponds to pairing stars from section 2 with stars from section 11. Continuing with this sequence, section pairing 342-3 pairs stars in sections 3 and 12, section pairing 342-4 pairs stars in sections 4 and 9, section pairing 342-5 pairs stars in sections 5 and 16, section pairing 342-6 pairs stars in sections 6 and 13, section pairing 342-7 pairs stars in sections 7 and 14, and section pairing 342-8 pairs stars in sections 8 and 15. Thus, all 16 sections are included in the pairing of image 340.

It may be appreciated that fewer than all of the stars may be paired during section pairing. For example, a first section may have more or fewer stars than a second section. The left over stars may be captured in operations illustrated by images 360, 380. Images 360, 380 are configured to illustrate a second round of star pairing. In this second round of star pairing, the image 360 may be divided into m sections, with m less than n. In this example, m is equal to 4. The sections in image 360 are numbered from 1 to 4, beginning with the upper left section and ending with the lower right section. Section 1 of image 360 corresponds to sections 1, 2, 5, and 6 of image 320. Similarly, section 2 of image 360 corresponds to sections 3, 4, 7, and 8 of image 320, section 3 of image 360 corresponds to sections 9, 10, 13, and 14 of image 320, and section 4 of image 360 corresponds to sections 11, 12, 15, and 16 of image 320. Image 380 is configured to illustrate section pairs and, during pairing, a star from a first section in a selected section pair may be paired with a star from a second section. Section pairing 382-1 corresponds to pairing stars from section 1 with stars from section 4, section pairing 382-2 corresponds to pairing stars from section 2 with stars from section 3.

A third round of pairing may be performed by pairing stars between a pair of sections of image 360 that include unpaired stars. It may be appreciated that two sections may include unpaired stars. Either section 1 or section 4, and either section 2 or section 3 may have unpaired stars. Stars may be paired between the two sections with unpaired stars. A fourth round of pairing they then be performed in the remaining section that has unpaired stars.

Thus, a number of star images in a star field image may be paired and each star pair may have relatively a large inter-star angle, e.g., in the range 60° to 120°, as described herein. This pairing technique is heuristic and is configured to be implemented in real time. It may be appreciated, that other techniques may be used with a corresponding constraint on processing time.

Figure 4:
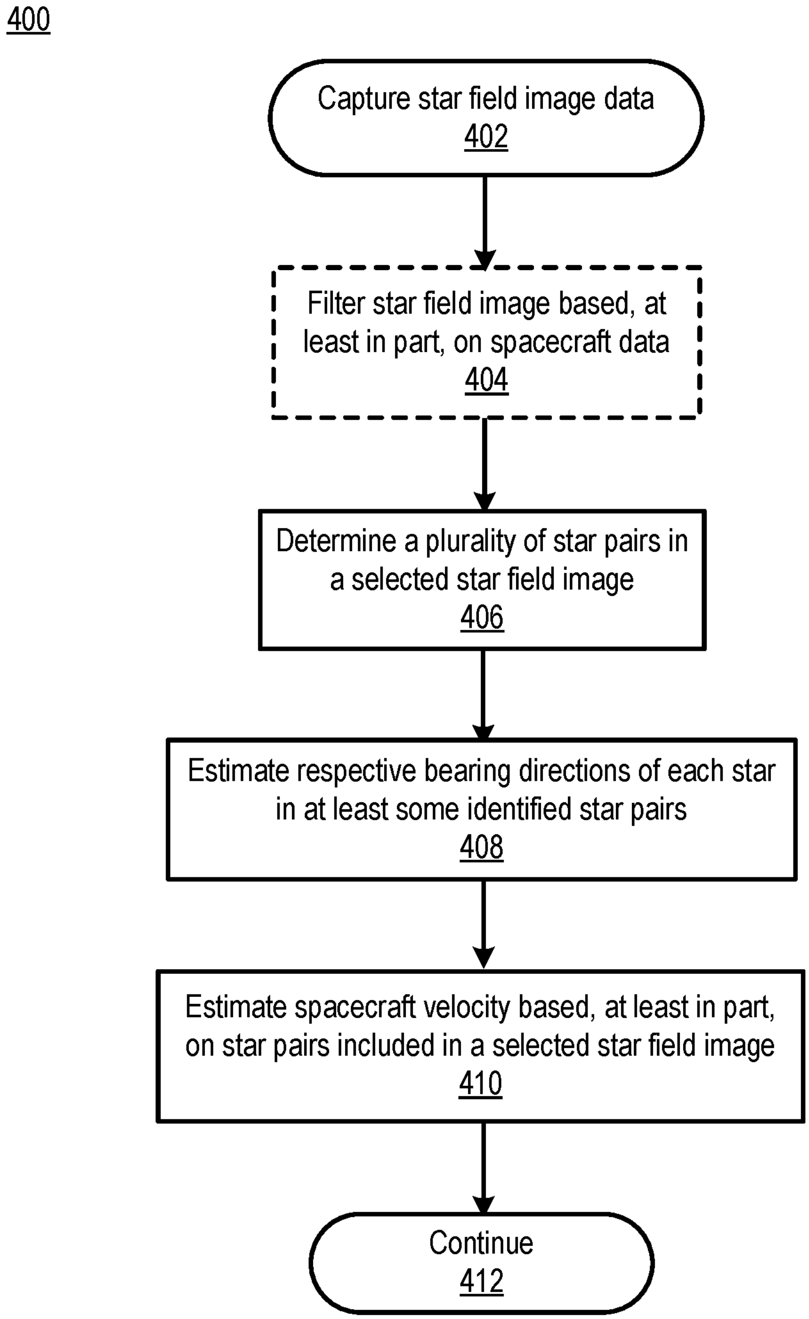
FIG. 4 is a flowchart of instantaneous velocity estimation operations, according to various embodiments of the present disclosure.

FIG. 4 is a flowchart 400 of instantaneous velocity estimation operations, according to various embodiments of the present disclosure. In particular, the flowchart 400 illustrates estimating spacecraft velocity based, at least in part, on inter-star angles estimated from a selected image captured by a wide FOV camera. The operations may be performed, for example, by the optical sensor system 101 (e.g., optical sensor 102, and/or StarNAV module 106) of FIG. 1.

Operations of this embodiment may begin with capturing star field image data at operation 402. In some embodiments, the star field image may be filtered based, at least in part, on spacecraft data at operation 404. The spacecraft data may include vibration and/or angular motion information received from the spacecraft. The filtering may be configured to reduce or eliminate an effect of the vibration and/or angular motion on star image data. Operation 406 includes determining a plurality of star pairs in a selected star field image. Operation 408 includes estimating respective bearing directions of each star in at least some identified star pairs. Operation 410 includes estimating spacecraft velocity based, at least in part, on star pairs included in a selected star field image. Program flow may then continue at operation 412.

Thus, a spacecraft velocity may be estimated based, at least in part, on inter-star angles between star pairs included in a selected star field image.

Figure 5:
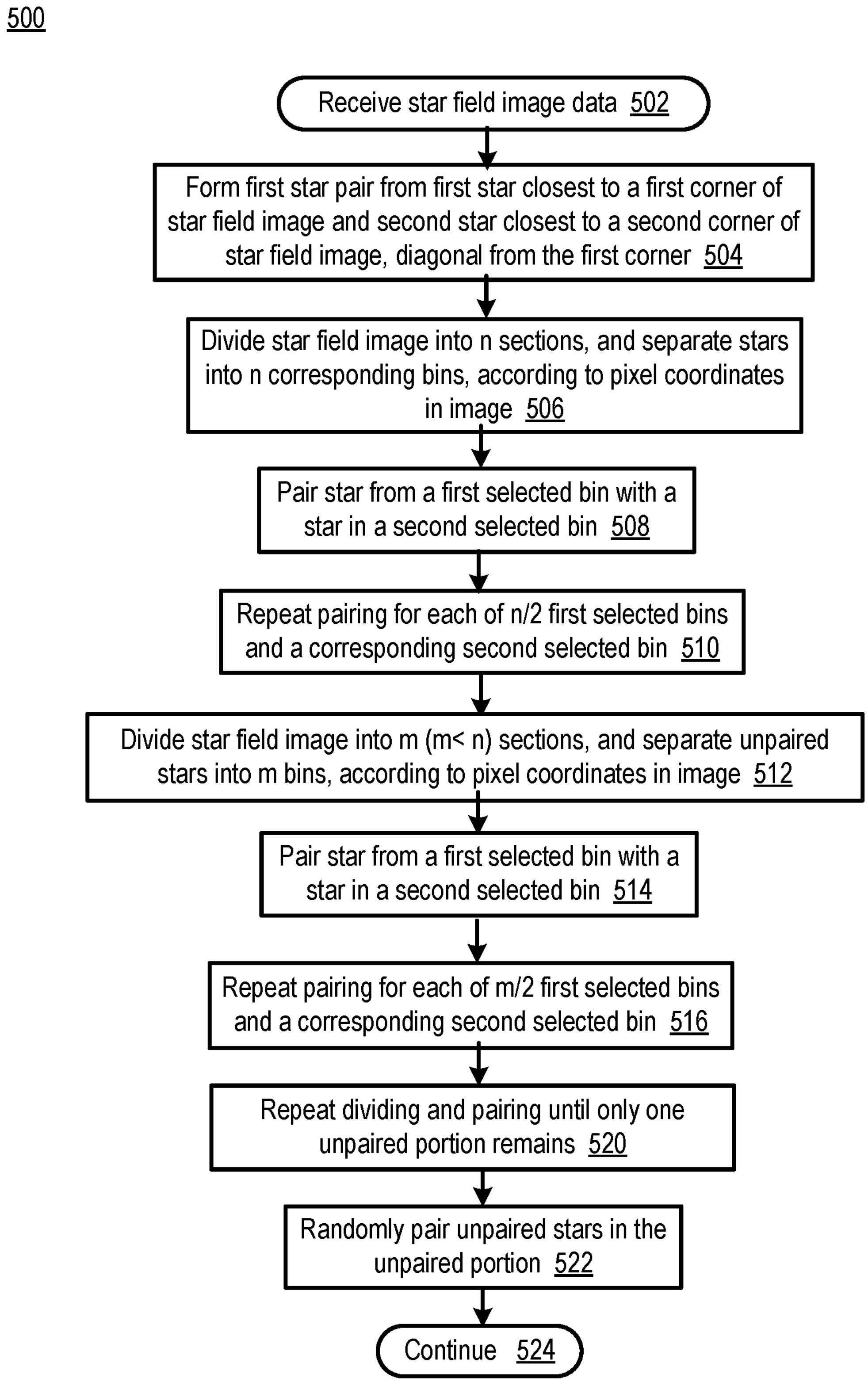
FIG. 5 is a flowchart of star pairing operations, according to various embodiments of the present disclosure.

FIG. 5 is a flowchart 500 of star pairing operations, according to various embodiments of the present disclosure. In particular, the flowchart 500 illustrates determining a plurality of star pairs in a selected star field image, and ensuring that at least some inter-star angles are relatively large. The operations may be performed, for example, by the StarNAV module 106 (e.g., star pairing module 130) of FIG. 1.

Operations of this embodiment may begin with receiving star field image data at operation 502. Operation 504 includes forming a first star pair from a first star closest to a first corner of a star field image and a second star closest to a second corner of the star field image, the second corner diagonal from the first corner. Operation 506 includes dividing the star field image into n sections, and separating stars into n corresponding bins, according to pixel coordinates in the image. Operation 508 includes pairing a star from a first selected bin with a star in a second selected bin. Operation 510 includes repeating pairing, for each of n/2 first selected bins, and a corresponding second selected bin. Operation 512 includes dividing the star field image into m (m<n) sections, and separating unpaired stars into m bins, according to pixel coordinates in the image. Operation 514 includes pairing stars from a first selected bin with a star in a second selected bin. Operation 516 includes repeating pairing, for each of m/2 first selected bins, and a corresponding second selected bin. Operation 520 includes repeating the dividing and pairing until only one unpaired portion remains. Unpaired stars may be randomly paired at operation 522. Program flow may then continue at operation 524.

Thus, a number of star images in a star field image may be paired and each star pair may have relatively a large inter-star angle, e.g., in the range 60° to 120°, as described herein.

A StarNAV optical sensor system, according to the present disclosure, may be configured to estimate a velocity of a spacecraft using starlight, based, at least in part, on stellar aberration. The StarNAV optical sensor system may include an optical sensor that includes at least one wide FOV camera. One or more parameters of the optical sensor system may be selected configured to achieve a TVE less than or equal to a target maximum value. The parameters may include, but are not limited to, number of cameras, camera parameters for each camera (e.g., a focal length, field of view (FOV), instantaneous field of view (ifov, i.e., the angle swept out by a single pixel), resolution (i.e., number of pixels in a focal plane array)), minimum star brightness detectable, centroiding capability, target signal to noise ratio (SNR), and/or bearing error (i.e., uncertainty in a line of sight measurement to a star).

As used in any embodiment herein, the terms "logic" and/or "module" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may include, for example, singly or in any combination, hardwired circuitry, programmable circuitry such as computer processors comprising one or more individual instruction processing cores, state machine circuitry, and/or firmware that stores instructions executed by programmable circuitry. The logic and/or module may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

Memory 112 may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A method for determining a spacecraft instantaneous velocity using starlight, the method comprising:

determining, by a star pairing module, a plurality of star pairs in a selected star field image, the selected star field image comprising a plurality of star images;

estimating, by a line of sight estimation module, an apparent bearing direction to each star in at least some of the plurality of star pairs;

determining, by the line of sight estimation module, a respective apparent inter-star angle corresponding to one of the apparent bearing directions for each star pair of the least some star pairs, and determining a stellar aberration based on a change in the apparent inter-star angle of at least one of the plurality of star pairs; and estimating, by a velocity estimation module, a spacecraft velocity to within a total velocity error based, at least in part, on the apparent inter-star angles and the stellar aberration.

2. The method of claim 1, further comprising capturing, by an optical sensor, the selected star field image, the optical sensor comprising at least one wide field of view (FOV) camera.

3. The method of claim 1, wherein the determining the plurality of star pairs in the selected star field image comprises forming star pairs with relatively large inter-star angles.

4. The method of claim 1, wherein the estimating the apparent bearing direction comprises centroiding.

5. The method of claim 1, wherein each apparent inter-star angle is in the range of 60° to 120°.

6. The method of claim 1, wherein the total velocity error is less than or equal to a target total velocity error maximum.

7. The method of claim 1, further comprising filtering, by a StarNAV module, the star field image based, at least in part, on at least one of vibration and/or angular motion information received from the spacecraft, the filtering configured to reduce or eliminate an effect of the vibration and/or angular motion.

8. The method of claim 2, wherein a bearing error is less than or equal to 1/10 of an instantaneous field of view of the wide FOV camera and is related to a camera signal to noise ratio (SNR).

9. The method of claim 1, wherein determining the plurality of star pairs is configured to achieve at least some associated inter-star angles in a range of 60° to 120°.

10. The method of claim 1, wherein a star brightness cutoff magnitude is less than or equal to 14.

11. An optical sensor system for determining a spacecraft instantaneous velocity using starlight, the system comprising:

a star pairing module configured to determine a plurality of star pairs in a selected star field image, the selected star field image comprising a plurality of star images, a line of sight estimation module configured to; estimate an apparent bearing direction to each star in at least some of the plurality of star pairs; determine a respective apparent inter-star angle corresponding to one of the apparent bearing directions for each star pair of the least some star pairs; and determine a stellar aberration based on a change in the apparent inter-star angle of at least one of the plurality of star pairs, and a velocity estimation module configured to estimate a spacecraft velocity to within a total velocity error based, at least in part, on the apparent inter-star angles and the stellar aberration.

12. A computer readable storage device having stored thereon instructions that when executed by one or more processors result in the following operations comprising the method according to claim 1.

13. The system of claim 11, further comprising an optical sensor configured to capture at least one star field image, the optical sensor comprising at least one wide field of view (FOV) camera, each wide FOV camera configured to capture a respective star field image comprising a respective plurality of star images.

14. The system of claim 13, wherein the optical sensor comprises three wide FOV cameras, arranged orthogonally to each other.

15. The system of claim 13, wherein each wide FOV camera has a field of view of at least 40 degrees.

16. The system of claim 11, wherein the total velocity error is less than or equal to a target total velocity error maximum.

17. The system of claim 11, further comprising a StarNAV module configured to filter the star field image based, at least in part, on at least one of vibration and/or angular motion information received from the spacecraft, the filtering configured to reduce or eliminate an effect of the vibration and/or angular motion.

18. The system of claim 11, wherein the estimating the apparent bearing direction comprises centroiding.

19. The system of claim 11, wherein the determining the plurality of star pairs in the selected star field image comprises forming star pairs with relatively large inter-star angles.

20. The system of claim 13, wherein a bearing error is less than or equal to 1/10 of an instantaneous field of view of each wide FOV camera.

* * * * *